April 3, 1962     C. P. GOERZ ETAL     3,028,492

STEREOSCOPIC IMAGE REVERSING SYSTEM

Filed June 30, 1959     2 Sheets-Sheet 1

United States Patent Office 3,028,492
Patented Apr. 3, 1962

3,028,492
STEREOSCOPIC IMAGE REVERSING SYSTEM
Christian P. Goerz, Far Rockaway, and Heinrich Giesecke, Valley Stream, N.Y. (both of 461 Dought Blvd., Inwood 96, Long Island, N.Y.)
Filed June 30, 1959, Ser. No. 823,974
10 Claims. (Cl. 250—71)

This invention relates to a method and an apparatus for producing positive images of negative records by projection and it has particular relation to a stereoscopic method and apparatus of this type.

In photographic industry, particularly in the stereoscopic photogrammetry, i.e. in the production of maps from aerial photographs, paper prints are used for optical-plastic reconstruction of the image, because only negative records are produced in the camera.

Numerous attempts have been made in order to eliminate the time-consuming copying of negatives into positives, and to carry out the positive, or positive-plastic reconstruction of images directly from negative records.

Most of these attempts are based on the well known phenomenon that on a fluorescent screen excited by ultra-violet radiation, the fluorescence can be cancelled by the action of ultra-red radiation, so that those portions of the fluorescent screen which are under the effect of ultra-red radiation, appear dark or black. Thus, if the image of a photographic negative is projected onto an excited fluorescent screen, using ultra-red light for projection, the ultra-red rays passing through the clear areas of the negative cancel the fluorescence on the screen portions corresponding to said clear areas of the negative, while in the screen portions corresponding to the dark areas of the negative, which do not permit the passage of ultra-red rays, the fluorescence remains unaffected, so that a positive image of the projected negative appears on the fluorescent screen.

The known processes of the abovementioned type have several disadvantages. Objects of this invention are to provide means for avoiding these disadvantages.

One of these disadvantages is that the positive pictures produced by ultra-red projection do not have contrasts and sharpness sufficient for the high requirements of photogrammetry and cartography. It has been found that the quality of the pictures depends on limitation of the ultra-red spectral width and improvement of the quality is obtained by using ultra-red light of substantially only one wave length. In addition, it has been found that it is of advantage to activate the fluorescence screen by ultra-violet light of substantially only one wave length.

It has been further found that the pictures appear clearer and sharper when they are formed by light of substantially only one wave length, and therefore, means are provided which allow to eliminate all but one wave length from being viewed.

For good stereoscopic effect, it is further necessary that the two simultaneously viewed pictures have the same intensity, but it is difficult to achieve this when two screens are used. The fluorescent layers consists generally of a base comprising oxides of phosphorus, sulfur and selenium, which is sensitized by metal or metalloid compounds of Cu, Zn, Sn, Cs and others, and is activated by very fine dilutions of, for example, Bi, Em, Ce or Pb. The fluorescence, its excitation period and fade out time depend on quantity, purity and distribution of all these ingredients, and it is hardly possible to provide two screens with absolutely identical fluorescence.

It has now been found that a simple way to avoid this difficulty is to use one screen for both simultaneously viewed pictures. This screen is twice as large as a screen for a single picture, but its halves differ much less than two single screens. If a small unevenness of picture intensity remains or is caused by unevenness of the negatives, this unevenness can be eliminated by the additional use of a negative equalizing device known in the art under the name Vertoskop.

Another disadvantage of the processes and devices hitherto known, consists in the use of several different sources of light. In the known processes at least two lamps are used, one emitting primarily ultra-violet radiation and the other primarily ultra-red radiation. The ultra-violet as well as the ultra-red radiation require excitation and fade-out periods which differ with the sensitivity of the screen. These periods can be reduced by the use of pre-excited screens which are arranged exchangeably. But in this case, the pre-excitation requires a third lamp. For a practical solution, one set of three lamps is necessary for each screen whereby the number of lamps is increased to six. The multiplicity of lamps has the disadvantage that it is difficult to bring the lamps into matching conditions, and that they produce excessive heat whereby the use of a cooling device becomes necessary.

It has been found that these difficulties and disadvantages can be avoided by the use of one lamp which radiates both ultra-violet and ultra-red light.

Further objects of the present invention are to provide simple, reliable and relatively inexpensive means for attaining the abovementioned results. Still other objects will appear from the following description of an exemplifying embodiment of the invention, from the appended claims and from the accompanying drawings in which:

Figure 1:
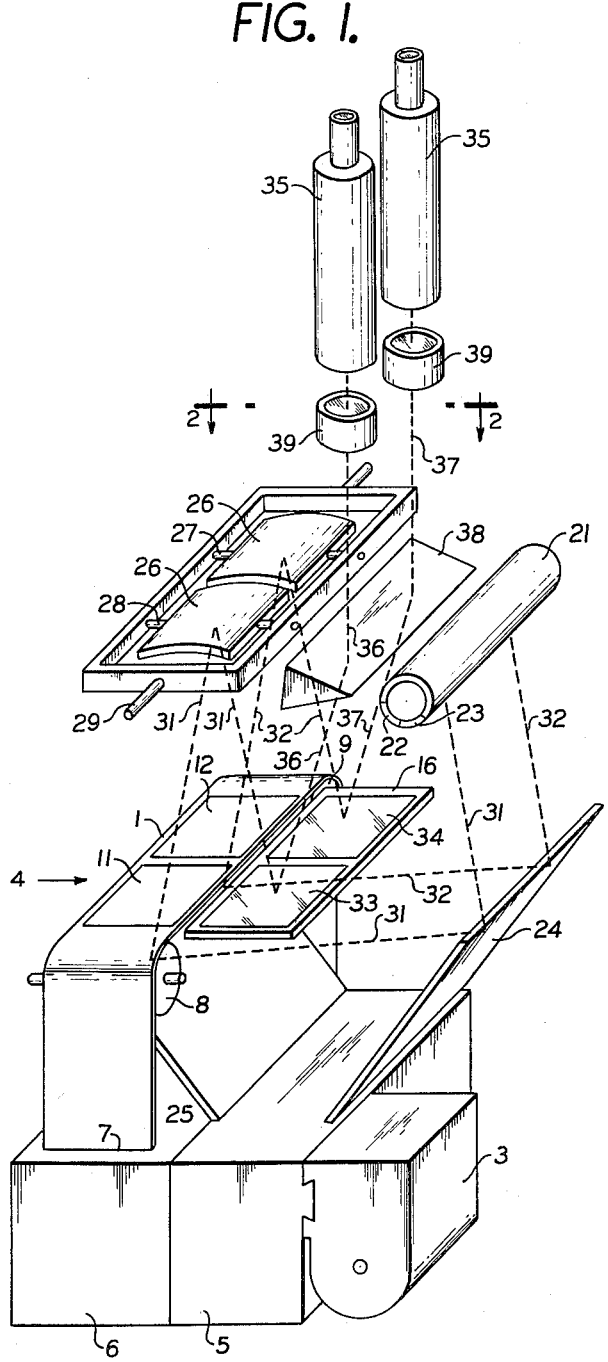
FIG. 1 shows a perspective view of an illustrative embodiment of the invention, some inclosing and supporting parts being omitted for the sake of clear representation of the essential and inventive parts.

Referring to the drawings, numeral 1 indicates a band-shaped film on which a series of negative pictures are photographed. These pictures may be taken, for example, from an airplane moving along whereby the pictures show the same ground objects as seen from different angles. The camera magazine 3 containing the film is attached to a housing comprising an automatic developing tank 5 and a drying chamber 6. The film is guided from the magazine 3 through the tank 5 and chamber 6 from which it emerges through a slot 7. Then, the film is guided over two rollers 8 and 9 which are so spaced from each other that a film part containing two negatives 11 and 12 is positioned in the free space between the rollers and thereby exposed to the passage of rays.

Figure 4:
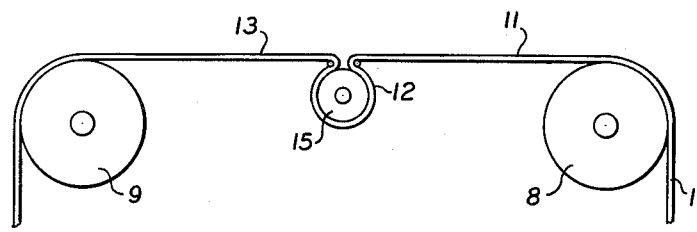
FIG. 4 shows a view, seen in the direction of arrow 4 in FIG. 1, of a modification of another detail, represented on a larger scale than FIG. 1.
Figure 5:
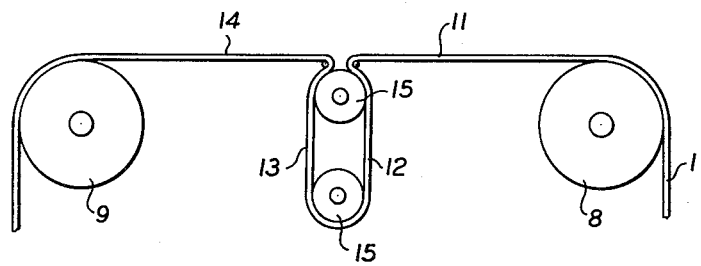
FIG. 5 shows another modification of the latter detail, represented in the same manner as FIG. 4.

In FIG. 1, the negatives 11 and 12 are neighbors in the series of taken pictures. Their viewing angle which is determined by flying way and altitude is, hence, relatively small. The modifications shown in FIGS. 4 and 5 allow to use two negatives which are farther remote in the series and, hence, correspond to a larger viewing angle whereby the stereoscopic effect is improved. In FIG. 4, the film 1 is guided about a further roller 15 positioned half way between the rollers 8 and 9 whereby the film forms a loop containing a negative 12 while two negatives which are not neighbors in the series are exposed to radiation, a negative 11 between the rollers 8 and 13, and a negative 13 between the rollers 15 and 9. In the modification shown in FIG. 5, the exposed negatives 11 and 14 are still farther remote from each other in terms of the series.

Figure 3:
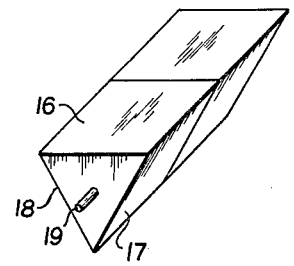
FIG. 3 shows a perspective view of a modification of a detail of the same embodiment.

A screen 16 is positioned aside of the exposed film part and parallel to the latter. Its upper fluorescence layer can be activated by ultra-violet light. In the modification illustrated in FIG. 3, there are two additional similar screens 17 and 18 which, together with screen 16, form a body of regular triangular cross-section. This body is rotatable about an axle 19 whereby each of the screens 17 and 18 can be positioned for use by turning the mentioned body. Before a screen is turned into position of use, it may be exposed to pre-excitement by ultra violet light. For example, screen 17 may be so pre-excited in the position shown in FIG. 3.

The screen body may be divided into halves along a plane perpendicular to its axis of rotation whereby it is made possible to rotate each half individually, thereby to position differently pre-excited halves for use, and thereby to compensate light differences of the two simultaneously viewed pictures. Instead or in addition, such light differences may be compensated by regulation of the lamp described in the following.

A mercury vapor-quartz glass lamp 21 has a cylindrical surface of which an arc is covered by a filter 22 allowing passage only of ultra-violet light of substantially one definite wave length. Another arc of the lamp cylinder is covered by a filter 23 allowing passage only of ultra-red light of substantially one definite wave length. The remaining arc of the lamp is preferably covered with reflectingly polished steel.

Figure 6:
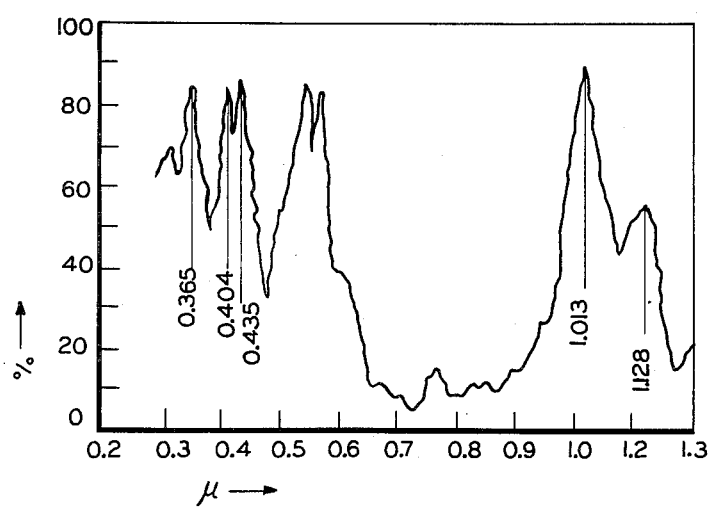
FIG. 6 shows a diagram of the lamp radiation.

Lamps of the mentioned type radiate ultra-violet as well as ultra-red light. The diagram FIG. 6 shows the intensity of radiation at the different wave lengths. The radiation curve shows peaks in the ultra-violet range at 0.365 and 0.40$\mu$ and in the ultra-red range at 1.013 and 1.128$\mu$. According to this invention, ultra-violet light and ultra-red light of one of these wave lengths is used. It has been found that most satisfactory results are attained if wave lengths of 1.013 and 0.365$\mu$ or 1.128 and 0.404$\mu$ are used.

The lamp 21 is preferably so positioned that its ultra-violet radiation is immediately directed toward screen 16 while the ultra-red light illuminates a mirror system which reflects this light to and through the exposed part of the film 1. This system comprises two so-called dark mirrors 24 and 25 which are made of copper coated with $Al_2O_3$—$SiO$—$GeO$. These dark mirrors reflect primarily only the waves of 1.0313 and 1.128$\mu$ whereby they act as filters and may be used instead of, or in addition to, the filter 23.

The ultra-red rays which have passed through the exposed negatives 11 and 12 are then reflected by two parabolic mirrors 26 which are so positioned that these rays are thrown toward the screen 16 and there produce positive reversals of the negatives due to the effect described before. The mirrors 26 are cardanically adjustable by rotation about axles 27, 28 and 29.

The way of the ultra-red rays passing through the centers of the two negatives 11 and 12 is indicated in FIG. 1 by dotted broken lines 31 and 32.

The positive pictures 33 and 34 produced on the screen 16 are stereoscopically viewed by two oculars or lens systems 35 which have the same distance from the screen 16. The ways of the central rays from the pictures 33 and 34 to the lens systems 35 are indicated by dotted lines 36 and 37. Preferably, a prism 38 and two prism system 39 are positioned in these ways.

The prism 38 serves to separate the light from the positive pictures into its different wave lengths whereby a single wave length can be isolated by well known means, and will provide a sharper picture in the viewer 35. It has been found that best contrasting pictures result when a monochromatic light of 0.404 or 0.435$\mu$ is used for viewing.

Figure 2:
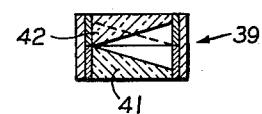
FIG. 2 shows an element of this embodiment in cross-section taken along line 2—2 in FIG. 1, and represented on a larger scale than FIG. 1.

Each of the prism systems 39 comprises two prisms 41 and 42 (FIG. 2) arranged co-axially and having wedge-shaped cross-sections. The prisms 41 and 42 are rotatable relative to each other about their common optical axis whereby the angle of deflection caused by the system can be adjusted. FIG. 2 shows the prisms 41 and 42 set for maximal deflection in full lines. Adjustment for minimal deflection zero is indicated by a dotted line. One of these prism systems is positioned in front of one of the viewer tubes 35, the other system before the other viewer tube.

By adjustment of these prism systems, the angular difference between pictures which are remote in the series of taken pictures can be compensated. A further advantage is that the amount of adjustment necessary for compensation gives a measure for the actual distances of the photographed objects, thus making telemetric measurement possible.

It is desired to be understood that this invention is not confined to the particular embodiment shown and described, the same being merely illustrative, and that the invention may be carried out in other ways within the scope of the appended claims without departing from the spirit of this invention, as it is obvious that the particular embodiment shown and described is only one of the many that may be employed to attain the objects of the invention.

What is claimed is:

1. An optical device for producing and stereoscopic viewing positive reversals of negatives photographed on a film, said device comprising means supporting said film exposed to the passage of rays, an opaque reflecting screen having a fluorescent surface layer capable of activation by ultra-violet light, a lamp radiating ultra-violet light of substantially one wave length toward said surface layer, and radiating ultra-red light of substantially one wave length through said film, the radiation curve of said light showing peaks in the ultra-violet range at 0.365 and 0.404$\mu$ and in the ultra-red range at 1.013 and 1.128$\mu$, means directing said ultra-red light through said film toward said fluorescent surface layer of the screen, whereby the projection of said negatives produce positive pictures on said screen, and means for stereoscopically viewing said positive pictures.

2. A device according to claim 1, further comprising a system of dark mirrors having a coating containing $Al_2O_3$, SiO and GeO and being positioned in the way of the ultra-red light between said lamp and said film whereby said ultra-red light radiates through said film after being reflected by said dark mirror system.

3. A device according to claim 1, further comprising a parabolic mirror positioned in the way of said ultra-red light between said film and said screen whereby said parabolic mirror projects an ultra-red picture of said negatives on said surface layer.

4. A device according to claim 1, further comprising a cardanically adjustable parabolic mirror positioned in the way of said ultra-red light between said film and said screen whereby said parabolic mirror projects an ultra-red picture of said negatives on said surface layer.

5. A device according to claim 1, further comprising a prism positioned between said screen and said viewing means whereby the light from said screen is separated into its different wave lengths and a single wave length can be singled out for more accurate viewing.

6. A device according to claim 1 in which said lamp is a mercury-vapor lamp having a quartz-glass tube, having a filtering coating translucent for ultra-violet light of one definite wave length at one portion of its outside and having a filtering coating translucent for ultra-red light of one definite wave length at another portion of its outside.

7. A device for producing and viewing positive reversals of negatives photographed on a film in series, said device comprising means supporting said film in a position in which two of said negatives are exposed to the passage of rays, a screen having an opaque base and a fluorescence surface layer capable of activation by ultra-violet light, a lamp radiating ultra-violet light toward said surface layer and radiating ultra-red light through said exposed negatives, means directing said ultra-red light after passage through said negatives toward said surface layer whereby the projections of said negatives produce positive pictures on said screen, and a viewer having two lens systems for viewing said positive pictures stereoscopically.

8. A device according to claim 7 and further comprising guiding means for forming a loop in said film between said exposed negatives whereby two negatives which are not neighbors in said series can be exposed simultaneously.

9. A device according to claim 7 and further comprising two prism systems, one positioned between one of said positive pictures and one of said viewer lens systems and the other between the other positive picture and the other viewer lens system, each of said prism systems having two prisms of wedge-shaped cross-section rotatable relatively to each other about a common optical axis.

10. A device according to claim 7 and further comprising additional screens having fluorescence surface layers and forming with said first mentioned screen a body of regular angular cross-section, said body being rotatable about its axis whereby each of said screens can be optionally positioned for use.

References Cited in the file of this patent

UNITED STATES PATENTS

| | | |
|---|---|---|
| 2,560,652 | Landauer | July 17, 1951 |
| 2,879,424 | Garbuny et al. | Mar. 24, 1959 |

FOREIGN PATENTS

| | | |
|---|---|---|
| 547,398 | Belgium | May 15, 1956 |
| 1,002,056 | France | Oct. 31, 1951 |